(12) United States Patent  
Azumai et al.

(10) Patent No.: US 8,823,999 B2  
(45) Date of Patent: Sep. 2, 2014

(54) IMAGE PROCESSOR AND IMAGE FORMING APPARATUS WITH DELAY STARTING OF IMAGE CONVERSION PROCESSING

(75) Inventors: Mitsuo Azumai, Hachioji (JP); Daijiro Saito, Hachioji (JP); Masanori Yoshizawa, Hino (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 283 days.

(21) Appl. No.: 13/347,487

(22) Filed: Jan. 10, 2012

(65) Prior Publication Data

US 2012/0176630 A1     Jul. 12, 2012

(30) Foreign Application Priority Data

Jan. 12, 2011   (JP) ................................. 2011-003514

(51) Int. Cl.  
*G06K 15/02*     (2006.01)  
*H04N 1/405*     (2006.01)  
*H04N 1/32*     (2006.01)

(52) U.S. Cl.  
CPC ......... *H04N 1/4052* (2013.01); *H04N 1/32571* (2013.01)  
USPC ............................. 358/1.2; 358/1.15; 358/1.1

(58) Field of Classification Search  
USPC .......................................... 358/1.1, 1.15, 1.2  
See application file for complete search history.

(56) References Cited

U.S. PATENT DOCUMENTS

| | | | |
|---|---|---|---|
| 6,876,468 B1 * | 4/2005 | Kanno et al. .................... | 358/1.9 |
| 2003/0067986 A1 * | 4/2003 | Yoon et al. ............... | 375/240.16 |

FOREIGN PATENT DOCUMENTS

JP      6-266324      9/1994

* cited by examiner

*Primary Examiner* — Benny Q Tieu  
*Assistant Examiner* — Martin Mushambo  
(74) *Attorney, Agent, or Firm* — Buchanan Ingersoll & Rooney PC

(57) ABSTRACT

Provided is an image processor obtaining image data divided in packing units, comprising: a parallel processing unit performing an image conversion processing in parallel on the pixel data arranged in a sub scan direction in the packing unit, based on the obtained pixel data and the intermediate value for the pixel data, to calculate an output value after the conversion of the pixel data and an index value; an intermediate value calculating unit calculating an intermediate value based on the respective index values calculated by the parallel processing units regarding pixels within a predetermined relative position range; and a first retention unit for delaying the start of the image conversion processing to one pixel data for a delay period set to be equal to or longer than a period required for obtaining the one pixel data and calculating the intermediate value for the one pixel data.

14 Claims, 11 Drawing Sheets

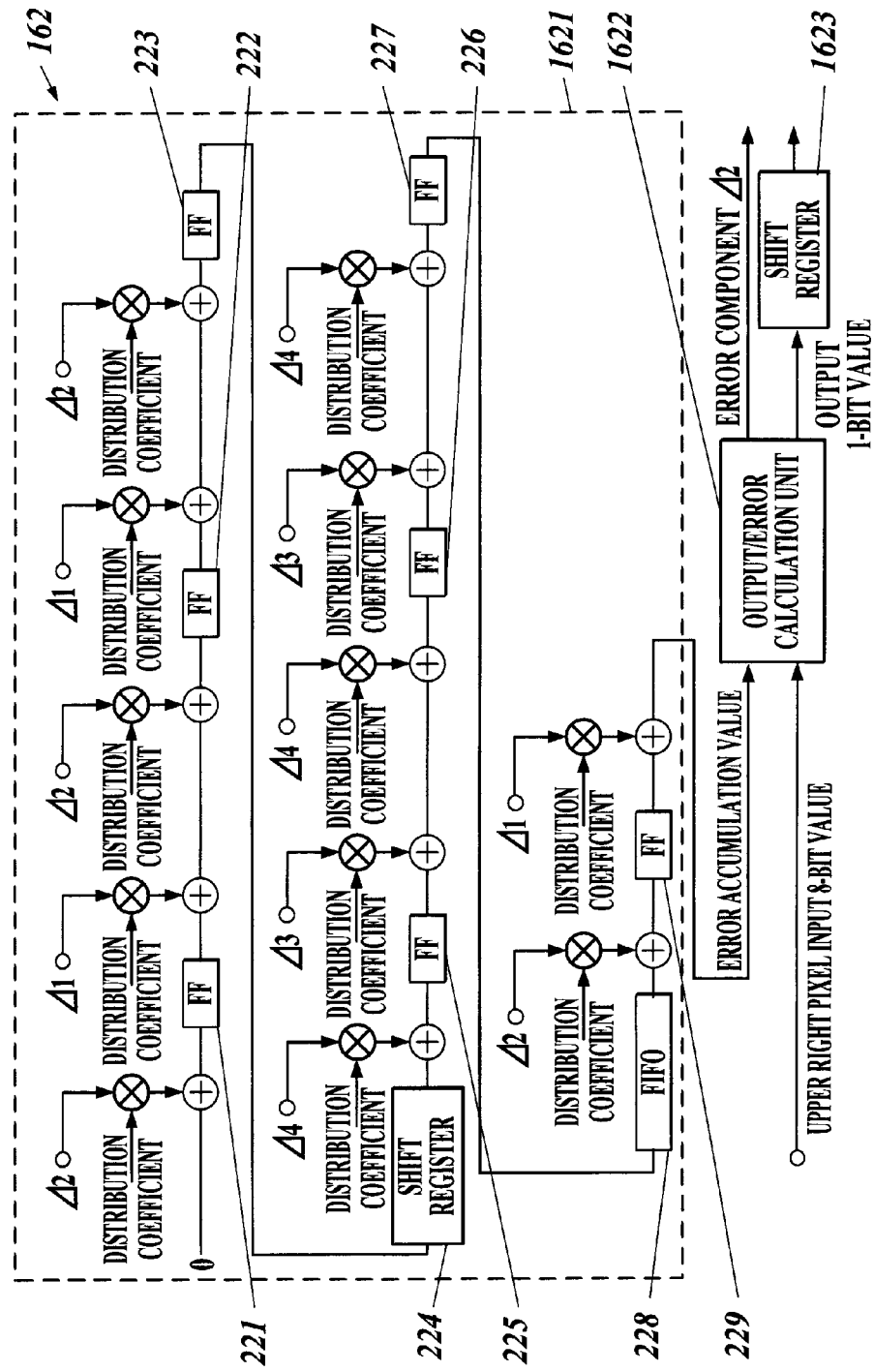

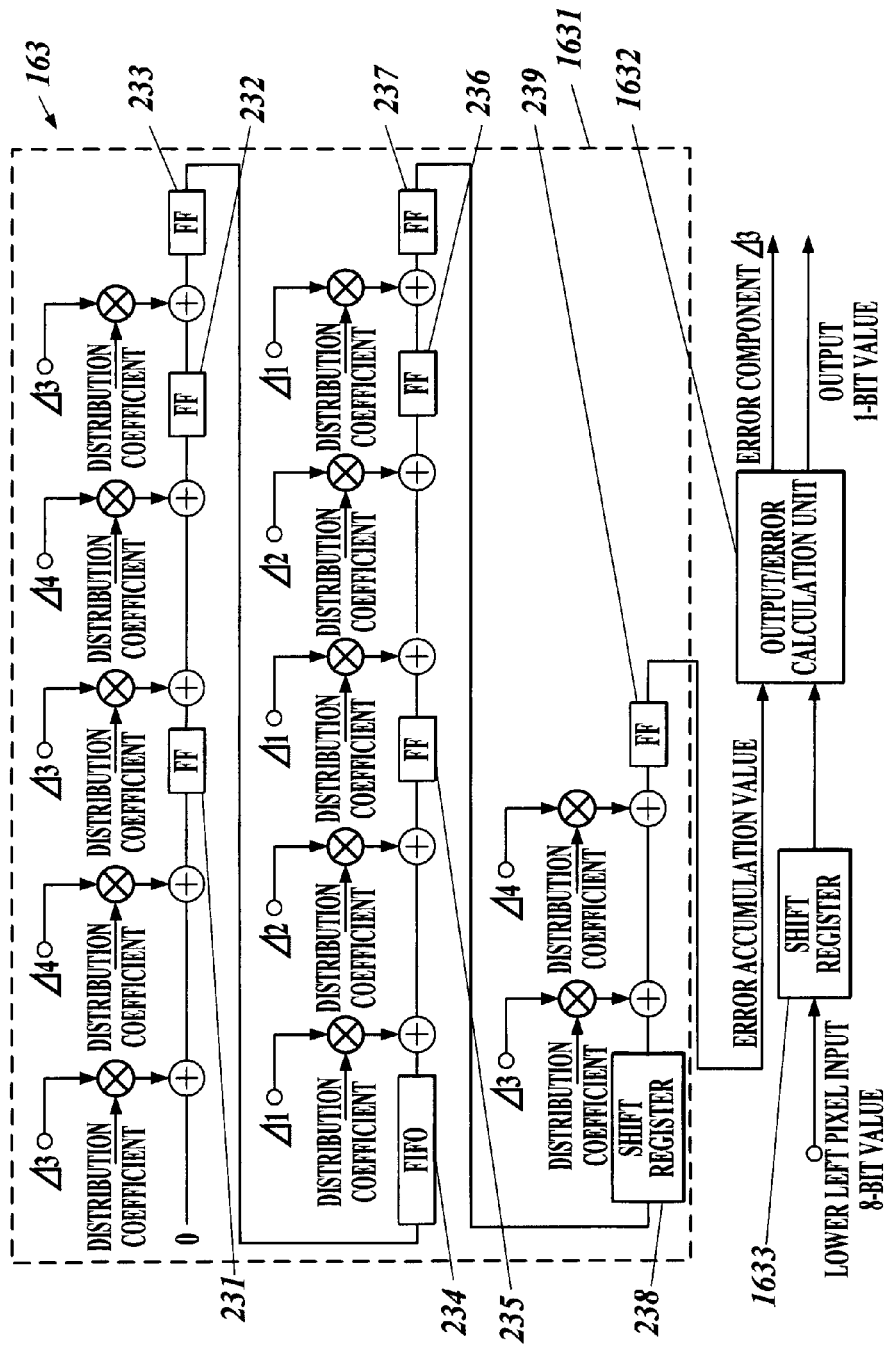

IMAGE PROCESSOR AND IMAGE FORMING APPARATUS WITH DELAY STARTING OF IMAGE CONVERSION PROCESSING

CROSS-REFERENCE TO RELATED APPLICATION

The present U.S. patent application claims a priority under the Paris Convention of Japanese patent application No. 2011-003514 filed on Jan. 12, 2011, which shall be a basis of correction of an incorrect translation, and is incorporated by reference herein.

BACKGROUND OF THE INVENTION

1. Field of the Invention

This invention relates to an image processor performing the processing of image data and an image forming apparatus including the image processor.

2. Description of the Related Art

Conventionally, an output of digital image data to a printer for example has been achieved by a halftone processing by which color values showing the tones of the respective display colors of the respective pixels are converted from multivalued data represented by a plurality of bits to binary data represented by 1 bit. In this halftone processing, one method to express the original image with a high image quality is an error diffusion algorithm. In the error diffusion algorithm, an error (difference) from the original multivalued data caused by the binarization of the respective color values is distributed to the surrounding pixels at a predetermined rate and is added to the color value of the same color for diffusion, thereby preventing reduced information amount.

In the halftone processing by this error diffusion algorithm, in order to calculate a value to be added to the color value of each pixel, the value must be stored in a memory as an intermediate value. A circuit, not only for the halftone processing but for other image processing using such an intermediate value, tends to become complicated, causing a longer processing time. Thus, in order to provide an image processing having a higher speed, Patent Publication 1 (Japanese Patent Laid-Open Publication No. H6-266324) for example discloses a technique according to which a plurality of image processing units are provided to the data of a plurality of scan lines so that the processing is carried out in a parallel manner for a higher speed.

On the other hand, depending on image data, it may be preferred to handle each data obtained by setting a plurality of predetermined pieces of pixel data respectively continuing in the main scan direction and the sub scan direction as a packing (hereinafter referred to as packing data). For example, in the case of image data that is subjected to a pixel number conversion processing for a high image quality, an image processing may be performed in such a manner that the respective pieces of pixel data packed based on the pixel range prior to the pixel number conversion are handled collectively, for a simpler handling.

However, there has been a disadvantage conventionally, that a long time is required to rearrange the respective pieces of packed pixel data according to the respective scan lines to input the packed pixel data to an image processing unit. Furthermore, when such packing data is used as input data in the halftone processing by the error diffusion algorithm, a disadvantage is caused where a processing becomes complicated or a high-speed processing cannot be provided effectively for example, by executing a processing while obtaining pixel data for the respective scan lines.

SUMMARY OF THE INVENTION

It is an objective of this invention to provide an image processor and an image forming apparatus to easily and stably increase the processing speed when the image processing including intermediate values is performed on packed image data.

A first aspect of the present invention is an image processor that obtains pieces of pixel data from a piece of image data divided in packing units, the packing units each being a predetermined matrix including a plurality of pixels at least in a sub scan direction, and that performs a predetermined image conversion processing using the respective pieces of pixel data and an intermediate value calculated for each piece of pixel data based on the other pieces of pixel data in the packing unit, the image processor comprising:

a parallel processing unit that performs the image conversion processing in parallel on a piece of pixel data arranged in the sub scan direction in the packing unit, based on the obtained piece of pixel data and the intermediate value for the piece of pixel data, to calculate an output value after the piece of pixel data is converted and an index value indicating an evaluation of the output value, respectively;

an intermediate value calculating unit that calculates, for the obtained piece of pixel data, the intermediate value based on the index value calculated by the parallel processing units for each of the pieces of pixel data within a predetermined relative position range; and a first retention unit that delays starting of the image conversion processing for one piece of pixel data by the parallel calculating unit for a delay period set to be equal to or longer than a period required from obtaining the one piece of pixel data until the intermediate value for the one pixel data is calculated by the intermediate value calculating unit.

In the image processor, preferably, the obtaining of the pieces of pixel data in the packing unit, and respective operations of the first retention unit, the parallel processing unit, and the intermediate value calculating unit are performed in synchronization with one clock signal.

In the image processor, preferably, the first retention unit serially retains the obtained pieces of pixel data for every relative position in the packing and delays the image conversion processing by the parallel processing unit, based on a delay amount set based on the relative position.

In the image processor, preferably, the intermediate value calculating unit calculates the intermediate value for the obtained piece of pixel data by sequentially adding the index value required for calculating the intermediate value, each time the parallel processing unit calculates the index value.

In the image processor, preferably, the image conversion processing is a halftone processing to binarize a multi-bit value representing the respective pieces of pixel data, the parallel processing unit calculates a difference between the multi-bit value of the obtained piece of pixel data and the binarized output value as the index value, and the intermediate value calculating unit calculates, as the intermediate value for the piece of pixel data, an accumulation value by adding values obtained by multiplying the index value at the respective pixels included in the relative position range by a predetermined distribution coefficient based on the relative position of the obtained piece of pixel data.

BRIEF DESCRIPTION OF THE DRAWINGS

The present invention will be completely understood through the detailed description shown below and the attached drawings. However, they do not intend to limit the present invention, wherein

FIG. 3B illustrates the configuration of the error diffusion processing unit;

FIG. 4A illustrates the configuration of the error diffusion processing unit;

DETAILED DESCRIPTION OF THE INVENTION

The following section will describe an embodiment of the present invention with reference to the drawings.

First Embodiment

Figure 1:
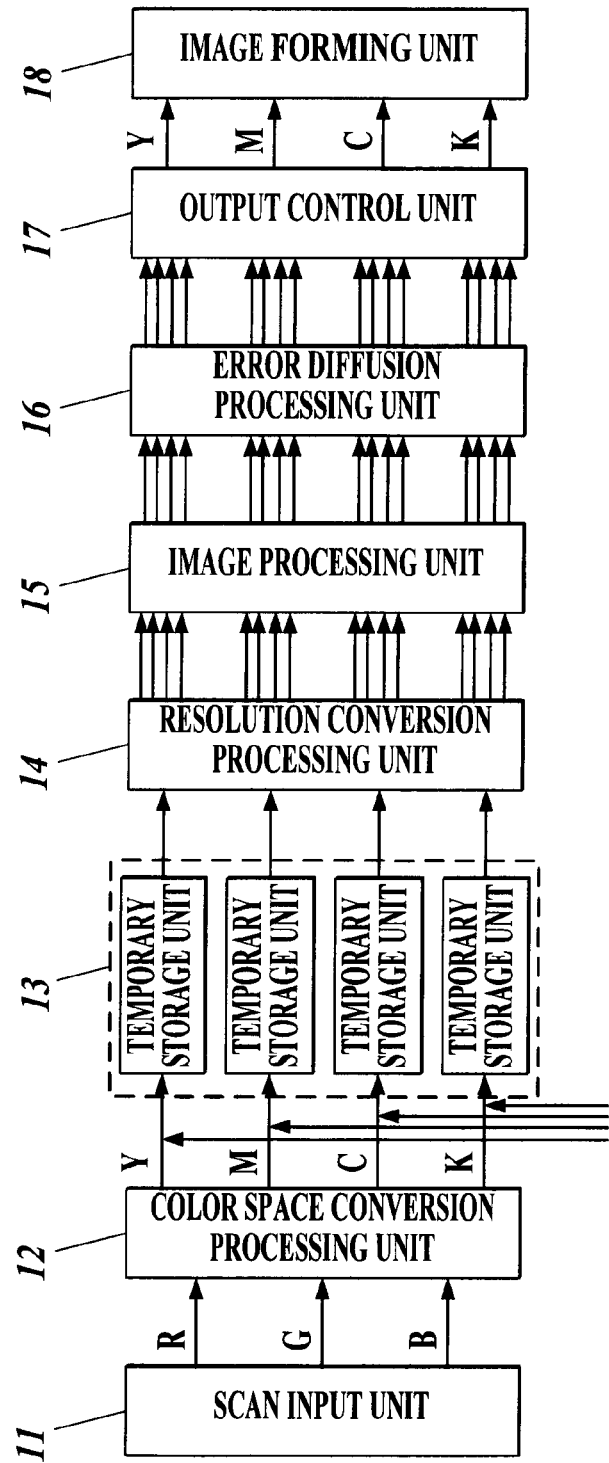
FIG. 1 illustrates the configuration of the image forming apparatus of the first embodiment of the present invention.

FIG. 1 illustrates the entire configuration of the image forming apparatus of the first embodiment. The image forming apparatus 1 in the first embodiment is an apparatus that subjects an input of packed image data to a halftone processing by an error diffusion algorithm to form binarized image data.

The image forming apparatus 1 includes: a scan input unit 11; a color space conversion processing unit 12; a temporary storage unit 13; a resolution conversion processing unit 14; an image processing unit 15; an error diffusion processing unit 16 as an image processor; an output control unit 17; and an image forming unit 18 for example.

The scan input unit 11 (input unit) performs an input processing of image data by pixel display obtained from an input device such as an image scanner or an Optical Character Reader (OCR). The color space conversion processing unit 12 performs a processing to convert image data represented by color spaces of RGB colors (three colors of red, green, and blue) each of which is 8 bit to image data represented by color spaces for the print output of CMYK colors (four colors of cyan, magenta, yellow, and black) each of which is 8 bit. Input data may be obtained from the data once stored in a removable media such as a PC storage apparatus (HDD, Hard Disk Drive), a flash memory, Compact Disc Recordable (CD-R), or Digital Versatile Disc Recordable (DVD-R). When image data by CMYK colors is directly inputted, the processing by the color space conversion processing unit 12 may be omitted. Various other processing may also be performed with the color space conversion processing.

The temporary storage unit 13 includes four storage units. These four storage units temporarily store the color values of image data outputted from the color space conversion processing unit 12, the color values showing the tones of the respective CMYK colors. This temporary storage unit 13 is a HDD or Dynamic Random Access Memory (DRAM) for example.

The resolution conversion processing unit 14 converts the resolution of the image data inputted from the scan input unit 11 or the like. In the image forming apparatus 1 of this embodiment, the resolution conversion processing unit 14 performs, for example, a processing to convert the inputted image data of 600 dpi (dot per inch) to data of 1200 dpi by a complementary processing. Specifically, one pixel in the data of a 600 dpi image is divided to four pixels in a matrix-like manner, which matrix being composed of two columns in the main scan direction times two rows in the sub scan direction in a 1200 dpi image. The image processing unit 15 assumes the four pixels as one piece of packing data for the image data converted to 1200 dpi and performs a processing to arrange the four pixels data in each packing to collectively send the same to the error diffusion processing unit 16. This processing may also be performed simultaneously with various other image processing.

The error diffusion processing unit 16 performs, based on the image data inputted from the image processing unit 15, a halftone processing using an error diffusion algorithm (which will be described in detail later). This error diffusion processing unit 16 includes four calculating units arranged in a parallel manner. This calculating unit sequentially receives the 8-bit data showing the color values of the respective CMYK colors of the packed four pixels in synchronization with a clock signal input (not shown) and outputs the respective pieces of binarized 1-bit data as output values to the output control unit 17. The four calculating units exchange error values, which occurred by the respectively performed halftone processing, as an index value regarding the evaluation of an output value. Circuits constituting this error diffusion processing unit 16 are collectively formed on an Application Specific Integrated Circuit (ASIC). This ASIC may also have thereon other processing circuits for other image processing functions for packed image data.

The output control unit 17 rearranges, in a predetermined order, the image data obtained by binarizing the respective color values of the CMYK colors of the respective pixels in the error diffusion processing unit 16. The output control unit 17 also controls the timing at which this binarized signal or an operation control signal for using the binarized signal is outputted to the image forming unit 18 or an external device (e.g., shared printer). This timing control processing may be independently performed by the Central Processing Unit (CPU) and the Random Access Memory (RAM) provided in the output control unit 17 for example or may also be integratedly performed by a microcomputer (not shown) responsible for the power source control, the input control in the scan input unit 11, or the ON/OFF control of the operation of the error diffusion processing unit 16. Based on the outputted operation control signal, the image forming unit 18 forms an image.

Next, the following section will describe the error diffusion pattern in the image forming apparatus 1 of this embodiment and the configuration of the error diffusion processing unit 16.

Figure 2A:
FIG. 2A illustrates an example of an error diffusion pattern.
Figure 2B:
FIG. 2B illustrates an example of the error diffusion pattern.

FIG. 2A and FIG. 2B illustrate the error diffusion processing pattern used by the image forming apparatus of the first embodiment of the present invention. FIG. 3A, FIG. 3B, FIG. 4A, and FIG. 4B illustrate the configuration of the error diffusion processing unit.

With regard to a relative position range, which is herein referred to as the range of positions of pixels relative to the one pixel within which errors are distributed from the one piece of pixel data, and the distribution coefficient pattern at the each relative position, there is a plurality of known ones having a high accuracy among which an appropriate one is selected. As shown in FIG. 2A, the error diffusion pattern used by the image forming apparatus 1 of the first embodiment of the present invention is set so that, based on the position of the pixel to be subjected to a halftone processing as a reference (E03), the error diffusion range is judged to include the total of 12 pixels. The 12 pixels are composed of: 2 pixels forward to this reference pixel on the same scan line in the main scan direction (E04, E05); 2 pixels forward to this reference pixel in the sub scan direction (E13, E23); 2 pixels forward to the pixel (E13) on the same scan line in the main scan direction (E14, E15); 2 pixels backward to the pixel (E13) on the same scan line in the main scan direction (E11, E12); 2 pixels forward to the pixel (E23) on the same scan line in the main scan direction (E24, E25); and 2 pixels backward to the pixel (E23) on the same scan line in the main scan direction (E21, E22). Then, the color values at the pixels within the error diffusion range are added with a distributed value that is obtained by multiplying the error component value (index value) occurred by the binarization of this color value at the target pixel subjected to the halftone processing, by the distribution coefficient predetermined based on the relative position of each pixel relative to the target pixel. Specifically, the error component generated for the respective color values at the pixel E03 of FIG. 2A is distributed and added to the respective color values of the hatched pixels E04, E05, E11 to E15, and E21 to E25. The values of the error components (index values) added to the respective color values of the pixel E23 are generated, as shown in FIG. 2B, in each of the pixels E01 to E05, E11 to E15, E21, and E22.

The distribution coefficient may be set to any value as long as the value is set to gradually decrease as the original pixel becomes distant, and all distribution coefficients sum up to 1. For example, in FIG. 2A, two pixels adjacent to the pixel E03 (pixel E04, E13) can have a distribution coefficient set to 7/48, four pixels adjacent to these two pixels (E05, E12, E14, E23) can have a distribution coefficient set to 5/48, four pixels that are adjacent to these four pixels and that are other than those having a distribution coefficient of 7/48 (E11, E22, E24, E15) can have distribution coefficient set to 3/48, and the remaining two pixels (E21, E25) can have a distribution coefficient set to 1/48. Errors occurred at the colors of the respective pixels during the halftone processing performed sequentially from the left side to the right side in the main scan direction and then from the top side to the bottom side of the sub scan direction are all distributed to the 8-bit data showing the color values of pixels not yet subjected to the halftone processing.

The error diffusion processing unit 16 which performs the halftone processing based on the error diffusion pattern as described above includes four calculating units 161 to 164 as shown in FIG. 3A, FIG. 3B, FIG. 4A, and FIG. 4B.

Figure 3A:
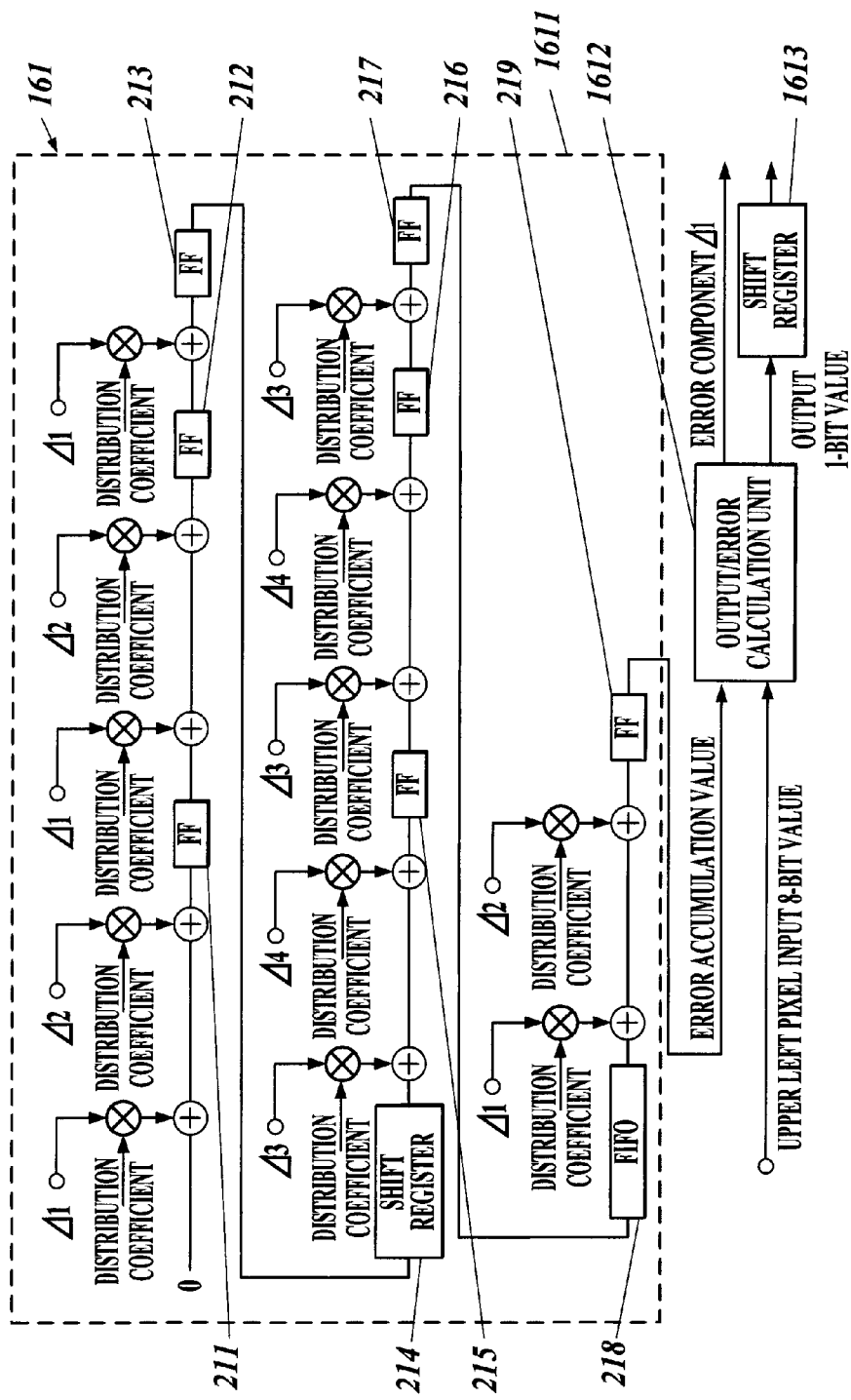
FIG. 3A illustrates the configuration of an error diffusion processing unit.
Figure 4B:
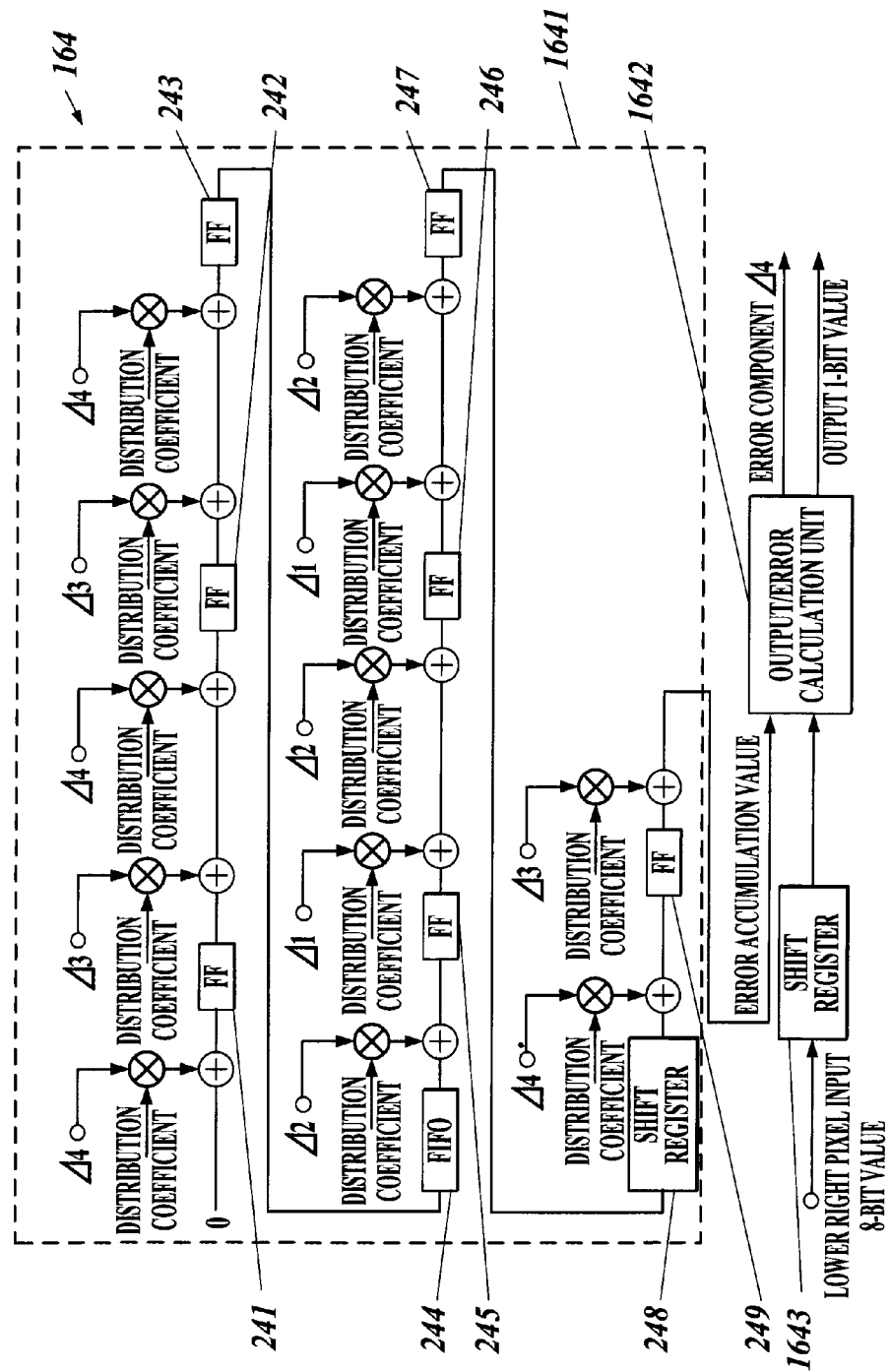
FIG. 4B illustrates the configuration of the error diffusion processing unit.

FIG. 3A illustrates a calculating unit 161 that performs the halftone processing on the 8-bit data showing the color values at the upper left pixel in the packing. FIG. 3B illustrates a calculating unit 162 that performs the halftone processing on the 8-bit data showing the color values at the upper right pixel in the packing. FIG. 4A illustrates a calculating unit 163 that performs the halftone processing on the 8-bit data showing the color values at the lower left pixel in the packing. FIG. 4B illustrates a calculating unit 164 that performs the halftone processing on the 8-bit data showing the color values at the lower right pixel in the packing. These calculating units 161 to 164 receive one 8-bit data sequentially inputted at every one clock cycle.

As shown in FIG. 3A, the calculating unit 161 includes: an error addition unit 1611 as an intermediate value calculating unit; an output/error calculating unit 1612 as a parallel calculating unit; and a shift register 1613 as a first retention unit. Similarly, the calculating unit 162 includes: an error addition unit 1621; an output/error calculating unit 1622; and a shift register 1623 (FIG. 3B). The calculating unit 163 includes: an error addition unit 1631; an output/error calculating unit 1632; and a shift register 1633 as the second retention unit (FIG. 4A). The calculating unit 164 includes: an error addition unit 1641; an output/error calculating unit 1642; and a shift register 1643 (FIG. 4B).

Each of the shift registers 1613, 1623, 1633, and 1643 is configured to retain color value inputted at every one clock cycle in an amount corresponding to L steps in an input order, and configured to output the data after L+1 steps. The step number L indicates a number of delayed steps. The step number L is higher than a packing number. The packing number indicates the distance, in the main scan direction, from the reference pixel to the most distant pixel to which errors are simultaneously distributed by the error diffusion (which is 3 in this embodiment).

Specifically, the calculating for the pixels on one main scan line in the packing is performed after the obtainment of the pixel data and the calculating of the error values to be distributed to the pixels on the previous main scan line. The error values are calculated in the binarization processing at pixels on the previous main scan line.

A value M indicating a half of the number of pixels in the main scan direction of the input image (in this embodiment, 600 dpi) is sufficiently higher than the packing number. In this embodiment, since each processing is performed in synchronization with a clock signal, the step number L is an integer.

Each of the error addition units 1611, 1621, 1631, and 1641 includes 12 adders that are tandem connected on a signal line which receive an initial value "0" from one end, 12 multipliers each of which are connected to each of the adders, 7 flip-flop (FF) circuits provided among the 12 adders on the signal line, a shift register on the signal line, and a First-In First-Out (FIFO) memory on the signal line. The order for arranging, on the signal line, the adders, FF, shift register, and FIFO memory is different depending on the error addition unit 1611, 1621, 1631, or 1641 as described later. The 12 multipliers receive distribution coefficients predetermined for the respective multipliers and error component values respectively calculated by the calculating units 161 to 164. These error addition units 1611, 1621, 1631, and 1641 output, to the output/error calculating units 1612, 1622, 1632, and 1642, an error accumulation value that is calculated by the error diffusion algorithm and that is used as an intermediate value added to the color values at the respective pixels.

The output/error calculating units 1612, 1622, 1632, and 1642 perform a calculating of a binarized color value and an error component value occurred by the binarization on the basis of the inputted color values at the respective pixels and the error accumulation value to the color values. Further, the output/error calculating units 1612, 1622, 1632, and 1642 output the binarized color value and the error component value.

The output/error calculating units 1612, 1622, 1632, and 1642 may include any members such as: an adder, a comparator, and a substracter.

The adder performs calculating the sum of these color values and the error accumulation value.

The comparator performs comparing the output from the adder with a predetermined threshold value (128 in this embodiment) with regard to the magnitude thereof and calculating, based on the comparison result, a 1-bit output signal (1 and 0) as a binarized color value.

The subtracter performs calculating a difference between the output from the adder and the 8-bit signal (i.e., 255 and 0) based on the output from the comparator and outputting the result value as an error component value.

Next, the following section will describe the operation of the calculating unit of this embodiment.

The calculating units 161 to 164 of this embodiment perform, in synchronization with a clock signal inputted from the outside, a series of calculating to calculate the input and output of data for every one step, the data movement in the shift register, and one data to be outputted.

As shown in FIG. 3A, the calculating unit 161 receives 8-bit data showing the color value at the upper left pixel in the packing. Then, the output/error calculating unit 1612 adds the inputted 8-bit value to the error accumulation value for this pixel calculated by the error addition unit 1611 (the calculating will be described later). Next, the result value is binarized and is transmitted to the shift register 1613. Specifically, when the 8-bit input value added with the error accumulation value is 128 or more, the 1-bit output value binarized to be expressed by 1 bit is set to "1". When the 8-bit input value added with the error accumulation value is 127 or less, the 1-bit output value is set to "0". Then, this binarized data is outputted from the shift register 1613 at processing of the L+1 step and is transmitted from the calculating unit 161 to the output control unit 17.

When the binarized output value is "1", the output/error calculating unit 1612 calculates a difference between the maximum value 255 represented by 8-bit and the 8-bit input value added with the error accumulation value as an error component $\Delta 1$. When the binarized output value is "0" on the other hand, the output/error calculating unit 1612 calculates a difference between the 8-bit input value added with the error accumulation value and the value 0 as an error component $\Delta 1$.

As shown in FIG. 4A, the calculating unit 163 receives the 8-bit data showing the color value at the lower left pixel in the packing. The inputted 8-bit data is first transmitted to the shift register 1633 and is retained during the L clock cycles. Thereafter, in the processing of the L+1th step, the output/error calculating unit 1632 adds the 8-bit input value outputted from the shift register 1633 to the error accumulation value for this pixel calculated by the error addition unit 1631 (the calculating will be detailed later). Next, the result value is subsequently binarized and is transmitted to the output control unit 17. Specifically, when the 8-bit input value added with the error accumulation value is 128 or more, the 1-bit output value is set to "1". When the 8-bit input value added with the error accumulation value is 127 or less, the 1-bit output value is set to "0".

The output/error calculating unit 1632 calculates, when the binarized output value is "1", a difference between the maximum value 255 represented by 8-bit and the 8-bit input value added with the error accumulation value as an error component $\Delta 3$. When the binarized output value is "0" on the other hand, the output/error calculating unit 1632 calculates the difference between the 8-bit input value added with the error accumulation value and the value 0 as the error component $\Delta 3$.

As shown in FIG. 3B, the calculating unit 162 receives the 8-bit data showing the color value at the upper right pixel in the packing. In the calculating unit 162, the error component $\Delta 1$ calculated by the calculating unit 161 is first inputted to the error addition unit 1621. Then, the output/error calculating unit 1622 adds the 8-bit input value to the error accumulation value of this pixel calculated by the error addition unit 1621 (the calculating will be detailed alter). Next, the result value is binarized and is transmitted to the shift register 1623. Specifically, when the 8-bit input value added with the error accumulation value is 128 or more, the 1-bit output value is set to "1". When the 8-bit input value added with the error accumulation value is 127 or less, the 1-bit output value is set to "0". Then, this binarized output value is outputted from the shift register 1623 at the L+1 step after L clock cycles and is transmitted from the calculating unit 162 to the output control unit 17.

When the binarized output value is "1", the output/error calculating unit 1622 calculates the difference between the maximum value 255 represented by 8 bit and the 8-bit input value added with the error accumulation value as an error component $\Delta 2$. When the binarized output value is "0" on the other hand, the output/error calculating unit 1622 calculates the difference between the 8-bit input value added with the error accumulation value and the value 0 as the error component $\Delta 2$.

As shown in FIG. 4B, the calculating unit 164 receives the 8-bit data showing the color value at the lower right pixel in the packing. The inputted 8-bit data is first transmitted to the shift register 1643 and is retained during L clock cycles. Thereafter, in the processing at the L+1th step, the error component $\Delta 3$ calculated by the calculating unit 163 is first inputted to the error addition unit 1641. Then, the output/error calculating unit 1642 adds the 8-bit input value outputted from the shift register 1643 to the error accumulation value of this pixel calculated by the error addition unit 1641 (the calculating will be detailed later). Next, the result value is subsequently binarized and is transmitted to the output control unit 17. Specifically, when the 8-bit input value added with the error accumulation value is 128 or more, the 1-bit output value is set to "1". When the 8-bit input value added with the error accumulation value is 127 or less, the 1-bit output value is set to "0".

when this binarized output value is "1", the output/error calculating unit 1642 calculates the difference between the maximum value 255 represented by 8 bit and the 8-bit input value added with the error accumulation value as an error component $\Delta 4$. When the binarized output value is "0" on the other hand, the output/error calculating unit 1642 calculates the difference between the 8-bit input value added with the error accumulation value and the value "0" as the error component $\Delta 4$.

Specifically, any 1-bit output data corresponding to the four pixels in the packing is configured to be simultaneously outputted to the output control unit 17 in the processing of the L+1th step being delayed from the input by L steps.

Next, the following section will describe the operation of the error addition units 1611, 1621, 1631, and 1641.

The error components $\Delta 1$ to $\Delta 4$ calculated through the processing at the respective steps by the output/error calculating units 1612, 1622, 1632, and 1642 are inputted to the error addition units 1611, 1621, 1631, and 1641. The output/error calculating units 1612, 1622, 1632, and 1642 calculate the inputted components.

Specifically, as shown in FIG. 3A, in the first processing, the error addition unit 1611 adds a value obtained by multiplying the error component Δ1 by a predetermined distribution coefficient to the initial value "0" and subsequently adds a value obtained by multiplying the error component Δ2 by the predetermined distribution coefficient to the result value. Then, the value obtained through the addition is stored in FF 211.

In the second processing, the error addition unit 1611 adds, a value obtained by multiplying the error component Δ1 by a predetermined distribution coefficient and a value obtained by multiplying the error component Δ2 by the predetermined distribution coefficient, which are calculated in this second processing, to the result value of the first processing stored in FF 211. Then, the value obtained through the addition is stored in FF 212.

In the third processing, the error addition unit 1611 adds a value obtained by multiplying the calculated error component Δ1 by the predetermined distribution coefficient to the result value of the second processing stored in FF 212. Then, the value obtained through the addition is stored in FF 213.

Each of the respective error components Δ1, Δ2, Δ1, Δ2, and Δ1 sequentially added as described above represents the values of the error components distributed from the pixels E00 to E04 in FIG. 2B.

The result value of the third processing stored in FF 213 represents intermediate data of the error accumulation value to be added to the 8-bit input value in the pixel E22.

At this point, the value stored in FF212 represents intermediate data of the error accumulation value to be added to the 8-bit input value in the pixel E23 based on the error components distributed from the pixels E01 to E04.

Furthermore, the value stored in FF 211 represents intermediate data of the error accumulation value to be added to the 8-bit input value in the pixel E24 based on the error components distributed from the pixels E03 and E04.

Next, the addition value stored in FF 213 is transmitted to the shift register 214 and is retained during the L−3 clock cycles.

Then, at the L+1th processing, a value obtained by multiplying the error component Δ3 by the predetermined distribution coefficient is added to the result value which is retained for total L clock cycles in the FF 211 to 213 and the shift register 214. Further, a value obtained by multiplying the error component Δ4 by the predetermined distribution coefficient is further added to the result value. Then, these addition values obtained through the addition are stored in FF 215. The error components Δ3 and Δ4 are values that are calculated by the output/error calculating units 1632 and 1642 after the shift registers 1633 and 1643 retain the color value for L clock cycles, respectively. Specifically, the error components Δ3 and Δ4 represent values for E10 and E11 in FIG. 2B.

In the next L+2th processing, a value obtained by multiplying the calculated error component Δ3 by the predetermined distribution coefficient and a value obtained by multiplying the error component Δ4 by the predetermined distribution coefficient are sequentially added to the addition value stored in FF 215. The result value is stored in FF 216. In the subsequent L+3th processing, only the value obtained by multiplying the calculated error component Δ3 by the predetermined distribution coefficient is added to the value stored in FF 216. The result value is transmitted to FF 217 and is stored. The values of these sequentially-calculated error components Δ3, Δ4, and Δ3 represent the values of the error components to the color values in the pixels E12 to E14 in FIG. 2B, respectively.

Next, the intermediate data of the error accumulation value to which the error components of the pixels E00 to E04 and E10 to E14 are added is transmitted to the First In First Out (FIFO) memory 218 and is serially retained for (M−L−3) clock cycles. Thereafter, in the M+1th processing, values obtained by multiplying the calculated error components Δ1 and Δ2 by the predetermined distribution coefficient are sequentially added to the value outputted from the FIFO memory 218. The the result value is stored in FF 219. The error components Δ1 and Δ2 added during the above process represent values of the error component in the pixels E20 and E21 in FIG. 2B. Thus, the value stored in FF 219 is an error accumulation value for the pixel E22. In the subsequent M+2th processing, in synchronization with the timing at which the 8-bit input value in the pixel E22 is inputted to the calculating unit 161, the error accumulation value is outputted from FF 219 to the output/error calculating unit 1612. Then, the output/error calculating unit 1612 calculates the output binary data and the error component Δ1.

As shown in FIG. 3B, at the first processing, the error addition unit 1621 first adds only a value obtained by multiplying the error component Δ2 by the predetermined distribution coefficient to the initial value "0". The result value is stored in FF 221. Then, a value obtained by multiplying the error component Δ1 calculated in the subsequent second processing by the predetermined distribution coefficient and a value obtained by multiplying the error component Δ2 by the predetermined distribution coefficient are subsequently added to the value stored in FF 221. The result value is stored in FF 222. Next, in the third processing, a value obtained by multiplying the calculated error component Δ1 by the predetermined distribution coefficient and a value obtained by multiplying the error component Δ2 by the predetermined distribution coefficient are subsequently added to the value stored in FF 222. The result value is stored in FF 223. These sequentially-calculated error components Δ2, Δ1, Δ2, Δ1, and Δ2 represent the values in the pixels E01 to E05 in FIG. 2B.

Next, the value stored in FF 223, which is the intermediate data of the error accumulation value, is transmitted to a shift register 224 and is retained for L−3 clock cycles. Then, in the L+1th processing, a value obtained by multiplying the error component Δ4 by the predetermined distribution coefficient is added to the result value which is retained for total L clock cycles in the FF 221 to 223 and the shift register 224. Thereafter, the result value is stored in FF 225. This error component Δ4 represents a value of the error component in the first processing calculated based on the input value being retained and delayed in the shift register 1643 for L steps. Specifically, this error component Δ4 represents the value of the error component in the pixel E11 in FIG. 2B.

In the next L+2th processing, a value obtained by multiplying the calculated error component Δ3 by the predetermined distribution coefficient and a value obtained by multiplying the error component Δ4 by the predetermined distribution coefficient are sequentially added to the addition value stored in FF 225. The result value is added to FF 226. In the subsequent L+3th processing, a value obtained by multiplying the calculated error component Δ3 by the predetermined distribution coefficient and a value obtained by multiplying the error component Δ4 by the predetermined distribution coefficient are added to the value stored in FF 226. Then, the result value is transmitted to FF 227 and is stored. The values of these sequentially-inputted error components Δ3, Δ4, Δ3, and Δ4 represent the values of the error components in the pixels E12 to E15 in FIG. 2B.

The result value for which the error components of the pixels E01 to E05 and E11 to E15 are added is subsequently transmitted to the First In First Out (FIFO) memory 228 and is serially retained for (M-L-3) clock cycles in an order of the input. Thereafter, in M+1th processing, a value obtained by multiplying the calculated error component Δ2 by each predetermined distribution coefficient is added to the value outputted from the FIFO memory 228. Then, the result value is stored in FF 229. The above added error component Δ2 represents a value of the error component in the pixel E21 in FIG. 2B. Then, in the subsequent M+2th processing, when the 8-bit input value regarding the pixel E22 is inputted to the calculating unit 161 and the error component Δ1 of the pixel E22 is calculated, the value of this error component is added to the value stored in FF 229. The result value is outputted to the output/error calculating unit 1622 as the final error accumulation value to the color value of the pixel E23 together with the 8-bit input value regarding the pixel E23. Then, the output/error calculating unit 1622 calculates the 1-bit output value and the error component Δ2.

As shown in FIG. 4A, in the addition and multiplication processing of the error addition unit 1631, a value obtained by multiplying the error component Δ3 by the predetermined distribution coefficient and a value obtained by multiplying the error component Δ4 by the predetermined distribution coefficient are subsequently added to the initial value "0". Then, the result value is stored in FF 231. The above added error components Δ3 and Δ4 are calculated at the same clock cycle as the error components Δ1 and Δ2. But the color value (8-bit data) for calculating the error components Δ3 and Δ4 is obtained by the error diffusion processing unit 16 L clock cycles ahead of the processing when the 8-bit data for calculating the error components Δ1 and Δ2. Specifically, the error components Δ3 and Δ4 to the input value of the pixels E10 and E11 obtained in the first step are inputted to the error addition unit 1631 in the L+1th processing.

In the subsequent L+2th processing, a value obtained by multiplying the error component Δ3 calculated in this processing by the predetermined distribution coefficient and a value obtained by multiplying the error component Δ4 by the predetermined distribution coefficient are sequentially added to the value stored in FF 231. The result value is stored in FF 232. Then, in the subsequent L+3th processing, a value obtained by multiplying the calculated error component Δ3 by the predetermined distribution coefficient is added to the value stored in FF 232 and the result value is stored in FF 233. Then, in the subsequent L+4th processing, the value stored in FF 233 is transmitted to the FIFO memory 234. Then, this FIFO memory 234 serially retains the inputted addition value for M-L-3 clock cycles in an order of the input.

After M-L-3 clock cycles, a value obtained by multiplying the error component Δ1 calculated during this clock cycle with the predetermined distribution coefficient and a value obtained by multiplying the error component Δ2 by the predetermined distribution coefficient are sequentially added to the value outputted from the FIFO memory 234 in the subsequent M+1th processing. The result value is stored in FF 235. Next, in the subsequent M+2th processing, a value obtained by multiplying the calculated error component Δ1 by predetermined distribution coefficient and a value obtained by multiplying the error component Δ2 by the predetermined distribution coefficient are sequentially added to the value stored in FF 235. The result value is stored in FF 236. Next, in the subsequent M+3th processing, a value obtained by multiplying the calculated error component Δ1 by the predetermined distribution coefficient is added to the value stored in FF 236. Then, the result value is stored in FF 237. Since the error components Δ1 and Δ2 have no delay in the L clock cycles, the error components Δ1, Δ2, Δ1, Δ2, and Δ1 sequentially calculated and added through the M+1th to M+3th processing represent error components occurred in the pixels E20 to E24, respectively.

The value stored in FF 237 is transmitted to a shift register 238 in the subsequent M+4th processing. Then, the value is retained in the shift register 238 for the L-3 clock cycles.

After the L-2 clock cycles, a value obtained by multiplying the calculated error component Δ3 by the predetermined distribution coefficient and a value obtained by multiplying the error component Δ4 by the predetermined distribution coefficient are sequentially added to the value outputted from the shift register 238 in the M+L+1th processing. The result value is stored in FF 239. The error components Δ3$n$ and Δ4 added in the M+L+1th processing represents, when considering the delay of the L, error components in the pixels E30 and E31, respectively.

Then, in the subsequent M+L+2th processing, in synchronization with the input of the 8-bit data of the pixel E32 to the calculating unit 163, the finally-calculated error accumulation value is outputted from FF 239 to the output/error calculating unit 1632.

Furthermore, as shown in FIG. 4B, in the addition and multiplication processing in the error addition unit 1641, a value obtained by multiplying the error component Δ4 by the predetermined distribution coefficient is added to the initial value "0". The result value is stored in FF 241. The above-added error component Δ4 is calculated at the same cycle as the error component Δ2. But the color value (8-bit data) for calculating the error component Δ4 is obtained L clock cycles ahead of the color value (8-bit data) for calculating the error component Δ2.

Specifically, the L+1th processing obtains the error component Δ4 corresponding to the input value of the pixel E11 obtained at the first step.

In the subsequent L+2th processing, a value obtained by multiplying the error component Δ3 by the predetermined distribution coefficient and a value obtained by multiplying the error component Δ4 by the predetermined distribution coefficient are sequentially added to the value stored in FF 241. The error component Δ3 is calculated in the pixel E12 and the error component Δ4 is calculated in the pixel E13 in this cycle. The result value is stored in FF 242.

In the subsequent L+3th processing, a value obtained by multiplying the error component Δ3 by the predetermined distribution coefficient and a value obtained by multiplying by the predetermined distribution coefficient are sequentially added to the value stored in FF 242. The error component Δ3 is calculated in the pixel E14 and the error component Δ4 is calculated in the pixel E15. The result value is stored in FF 243.

In the subsequent L+4th processing, the value stored in FF 243 is transmitted to the FIFO memory 244. This FIFO memory 244 serially retains the value as the intermediate data of the inputted error accumulation value for M-L-3 clock cycles in an order of the input.

Next, after the passage of M-L-3 clock cycles, a value obtained by multiplying the error component Δ2 calculated in this clock cycle with the predetermined distribution coefficient is added to the value outputted from the FIFO memory 244 in the subsequent M+1th processing. The result value is stored in FF 245. In the subsequent M+2th processing, a value obtained by multiplying the calculated error component Δ1 by the predetermined distribution coefficient and a value a value obtained by multiplying the error component Δ2 by the predetermined distribution coefficient are sequentially added to the value stored in FF 245. The result value is stored in FF 246. In the subsequent M+3th processing, a value obtained by multiplying the calculated error component Δ1 by the predetermined distribution coefficient and a value a value obtained by multiplying the error component Δ2 by the predetermined distribution coefficient are sequentially added to the value stored in FF 246. The result is stored in FF 247. Since the error components Δ1 and Δ2 have no delay in the L clock cycles, error components Δ2, Δ1, Δ2, Δ1, and Δ2 sequentially calculated and added during the M+1th to M+3th processing are error components occurred in the binarization of the color values in the pixels E21 to E25, respectively.

The value stored in FF 247 is transmitted in the subsequent M+4th processing to a shift register 248. Then, the value is retained in the shift register 248 for L–3 clock cycles. Thereafter, in the M+L+1th processing, a value obtained by multiplying the calculated error component Δ4 by the predetermined distribution coefficient is added to the value outputted from the shift register 248. The result value is stored in FF 249. The error component Δ4 added in the M+L+1th processing represents the error component in the pixel E31 when considering the delay in the Lth step. Then, in the subsequent M+L+2th processing, when the error component Δ2 regarding the pixel E32 calculated by the calculating unit 163 is inputted to the error addition unit 1641, the error component Δ2 is added to the value outputted from FF 249. Then, the result value is transmitted, to the output/error calculating unit 1642, as a final error accumulation value to the color value of the pixel E33.

As described above, the error diffusion processing unit 16 as the image processor included in the image forming apparatus 1 of the first embodiment includes: the output/error calculating units 1612, 1622, 1632, and 1642; and the error addition units 1611, 1621, 1631, and 1641.

The output/error calculating units 1612, 1622, 1632, and 1642 perform, based on the color value of the obtained pixel data and the error accumulation value corresponding to the color value, a halftone processing using an error diffusion algorithm on the 8-bit color value of the same number as the pixel number in the packing to calculate a binarized output value and the error component value occurred through the calculating of the output value.

The error addition units 1611, 1621, 1631, and 1641 multiply the error component values respectively calculated by the output/error calculating units by the predetermined distribution coefficient, and add the error accumulation value to calculate the error accumulation value for the color value of the obtained pixel data.

Here, the error component values are calculated with regard to the color values of the pixels in the predetermined range of pixel positions relative to the pixel regarding the color value of the obtained pixel data.

According to these output/error calculating units, the start of the halftone processing to one pixel data inputted for the L clock cycles by the error addition unit is delayed by the shift registers 1633 and 1643, the L clock cycles being equal to or longer than the period for calculating the error accumulation value for the one pixel data calculated from the inputted one pixel data. Thus, while allowing the calculating units 161 to 164 to exchange the calculated error component values, the error accumulation value based on these error components can be calculated in a simple and high-speed manner in parallel. Based on this error accumulation value and the 8-bit input value, the 1-bit output values and the error components of the color values in the respective pixels can be calculated in parallel in the same number as the number of pixels in the packing and in the same clock cycle. Thus, when the above configuration is compared with a case where the halftone processing is performed by a single calculating unit, the load can be dispersed, thus providing a stable and high-speed halftone processing on the whole.

Furthermore, the obtainment of the pixel data on the basis of a packing unit, the parallel calculating by the output/error calculating units 1612, 1622, 1632, and 1642, and the calculating of the error accumulation value by the error addition units 1611, 1621, 1631, and 1641 are performed in synchronization with the same clock signal. Therefore, while simply performing the control of the timing of the data input and output, the halftone processing of the image data involving the input and output on the basis of a packing unit can be performed at a high speed.

Furthermore, the halftone processing based on the pixel data obtained from one packing is performed within the same cycle of the clock signal with regard to the pixel data positioned on the same main scan line and is started, with regard to the pixel data positioned on a different main scan line, after the delay of L steps for every line number proceeded in the sub scan direction. Thus, even the pixel data inputted as a packing data does not require a complicated input/output processing such as the development or storage of the packing data. Thus the halftone processing to a plurality of main scan lines can be performed in parallel.

Furthermore, the error diffusion processing unit 16 includes the shift registers 1633 and 1643 that retain pixel data for L–3 clock cycles based on the relative position in the packing of the obtained pixel data. Thus, the above delay processing can be performed easily. Furthermore, pixel data sequentially inputted for each relative position within each packing can be serially subjected to the halftone processing simply in an order of the input.

Furthermore, the error diffusion processing unit 16 includes the shift registers 1613 and 1623 that retain the output value calculated by this error diffusion processing unit for a predetermined period based on the relative position in the packing. The period obtained by adding the period that the shift registers 1613 and 1623 retain values and the period that the shift registers 1633 and 1643 retain values for each relative position in the packing is set to the L cycles at the same clock cycle regardless of the relative position. Thus, the error diffusion processing unit 16 can not only receive the input of the packing data within the same clock cycle, but also output the pixel data, which is subjected to the halftone processing, in the format of the inputted packing data, within the same clock cycle.

Furthermore, whenever the output/error calculating units 1612, 1622, 1632, and 1642 calculate the error component values, the error addition units 1611, 1621, 1631, and 1641 calculate the error component accumulation values for the obtained pixel data by adding the error component values. Thus, the calculating of the error component values distributed to each pixel are prevented from being concentrated and can be dispersed, thus reducing the processing load.

The output/error calculating units 1622 and 1642 of the calculating units 162 and 164 operate after the error components Δ1 and Δ3 outputted from the calculating units 161 and 163 are respectively inputted to the error addition units 1621 and 1641 and the error accumulation values are calculated. Thus, when a rectangular wave repeating a high level and a low level at every half cycle is used as a clock frequency signal for example, the output/error calculating units 1612 and 1632 may be operated in synchronization with the rise of the rectangular wave at the start of the clock cycle and the output/error calculating units 1622 and 1642 may be operated in synchronization with the fall of the rectangular wave corresponding to a half of the clock cycle, respectively.

Modification Example 1

In the error diffusion processing unit 16 in the image forming apparatus 1 of the first embodiment, the four calculating units 161 to 164 to the packing data of 2×2 pixels are provided. The calculating units 161 to 164 respectively include the error addition units 1611, 1621, 1631, and 1641, the output/error calculating units 1612, 1622, 1632, and 1642, and the shift registers 1613, 1623, 1633, and 1643.

However, with regard to the pixel data arranged in the main scan direction as described above, after the calculating at the left side pixel data is completed and the error component value is obtained, the calculating to the color value at the right side pixel data is performed. Thus, there may also be a case where four error addition units and four shift registers are provided and two output/error calculating units, the number of the output/error calculating units determined only by the number of the lines in the sub scan direction (i.e., the number of main scan lines) are provided. In this case, the calculating of the pixel data provided in the main scan direction is continuously performed by a common output/error calculating unit within one clock cycle. In this case, a circuit to switch the input/output data to the output/error calculating unit is added as required.

According to the image forming apparatus 1 of the modification example 1 as described above, based on obtained pixel data and the error accumulation value to the pixel data, each one pixel data on a different main scan lines included in the packing is subjected in parallel to an image conversion processing. Each one pixel data on the same main scan line within the packing are sequentially subjected to the image conversion processing in a serial manner. Thus, the common output/error calculating unit can be used to more easily perform the image conversion processing in a stable and high-speed manner.

Second Embodiment

Next, the following section will describe the image forming apparatus of the second embodiment of the present invention.

Figure 5:
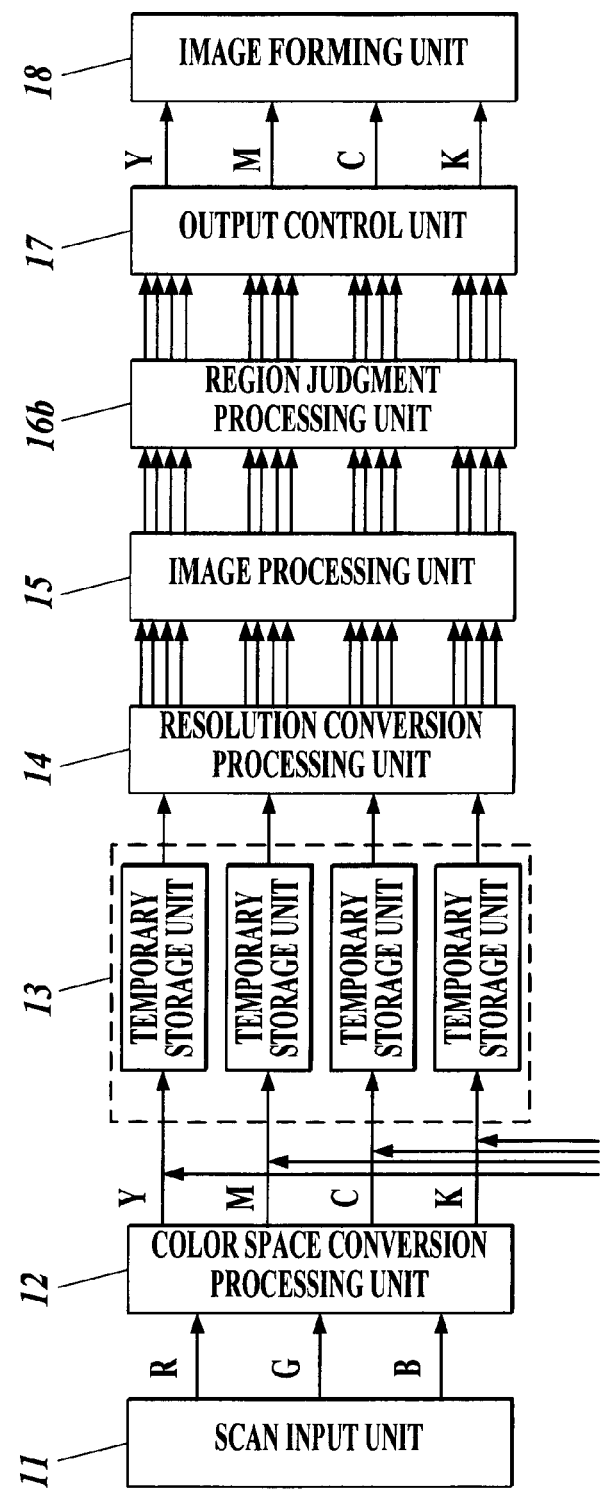
FIG. 5 illustrates the configuration of an image forming apparatus of the second embodiment.

FIG. 5 illustrates the entire configuration of the image forming apparatus of the second embodiment.

The image forming apparatus 1b of the second embodiment judges, based on the determination with regard to the gray level of pixels surrounding the inputted pixel, whether the region of the input pixel is a character display region or not. When the region of the input pixel is judged as the character display region but has a halftone, then the image forming apparatus 1b performs a processing to change the tone of the region to a white or black tone. This image forming apparatus 1b has the same configuration as that of the image forming apparatus 1 of the first embodiment except for that the error diffusion processing unit 16 is substituted with a region judgment processing unit 16b. Thus, the same components as those as the image forming apparatus 1 of the first embodiment are denoted with the same reference numerals and will not be described further.

FIG. 6A, FIG. 6B, FIG. 7A, and FIG. 7B illustrate the configuration of the region judgment processing unit 16b.

As shown in FIG. 6A, FIG. 6B, FIG. 7A, and FIG. 7B, the region judgment processing unit 16b includes the four calculating units 161b to 164b.

Figure 6A:
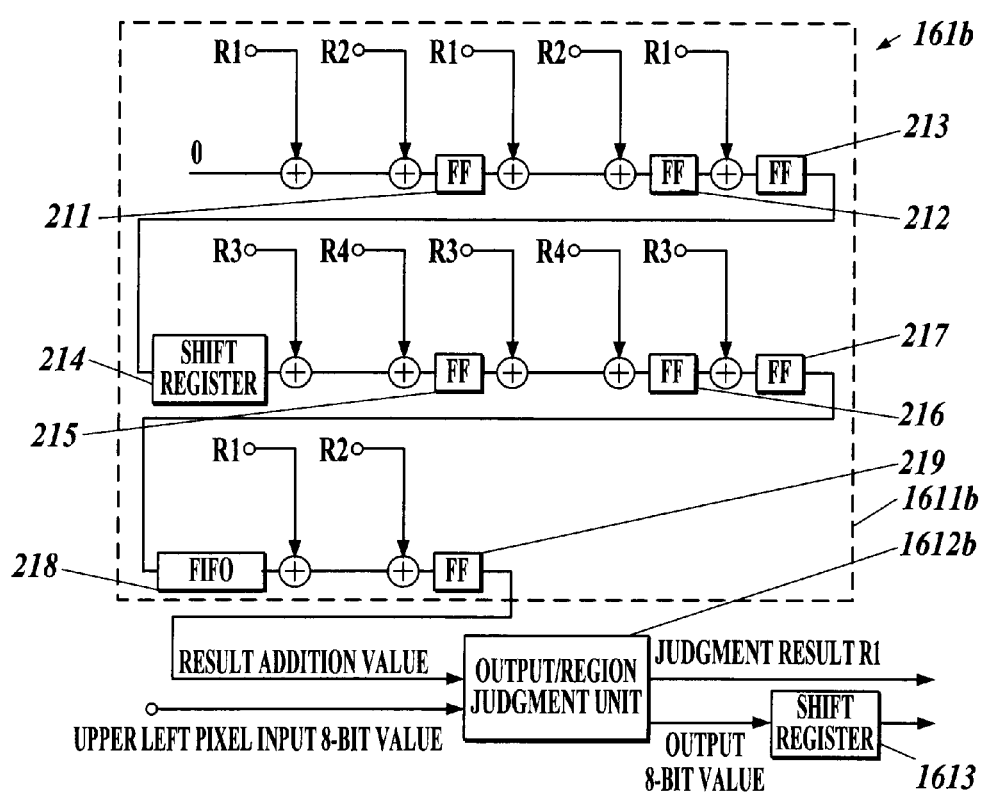
FIG. 6A illustrates the configuration of a region judgment processing unit.
Figure 6B:
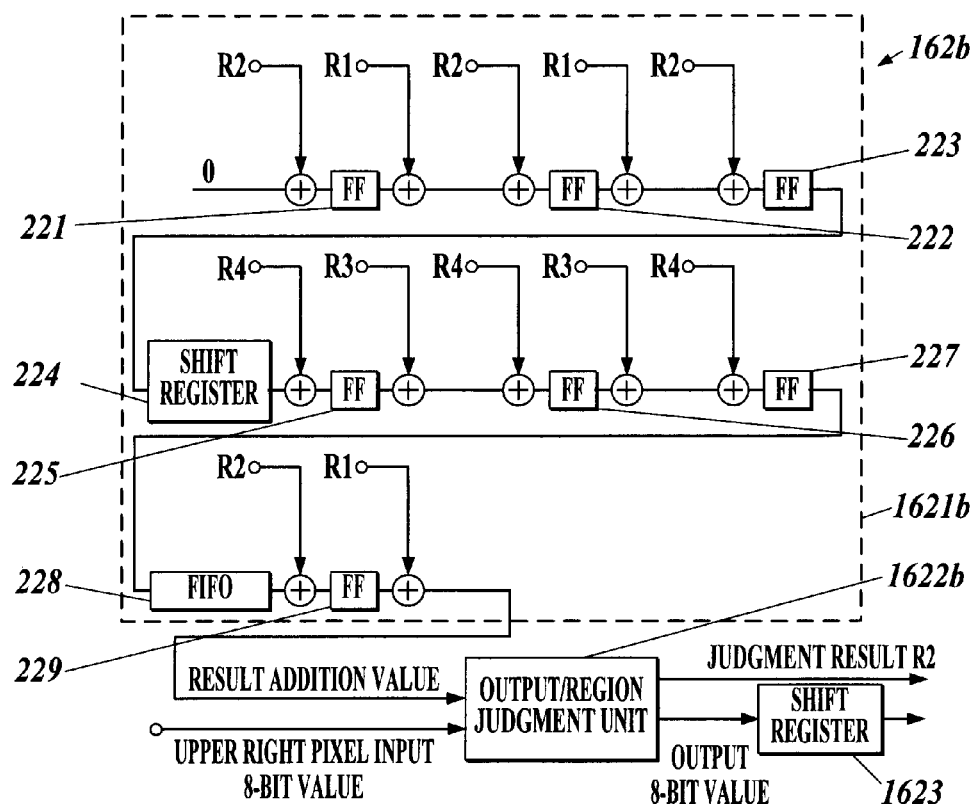
FIG. 6B illustrates the configuration of the region judgment processing unit.
Figure 7A:
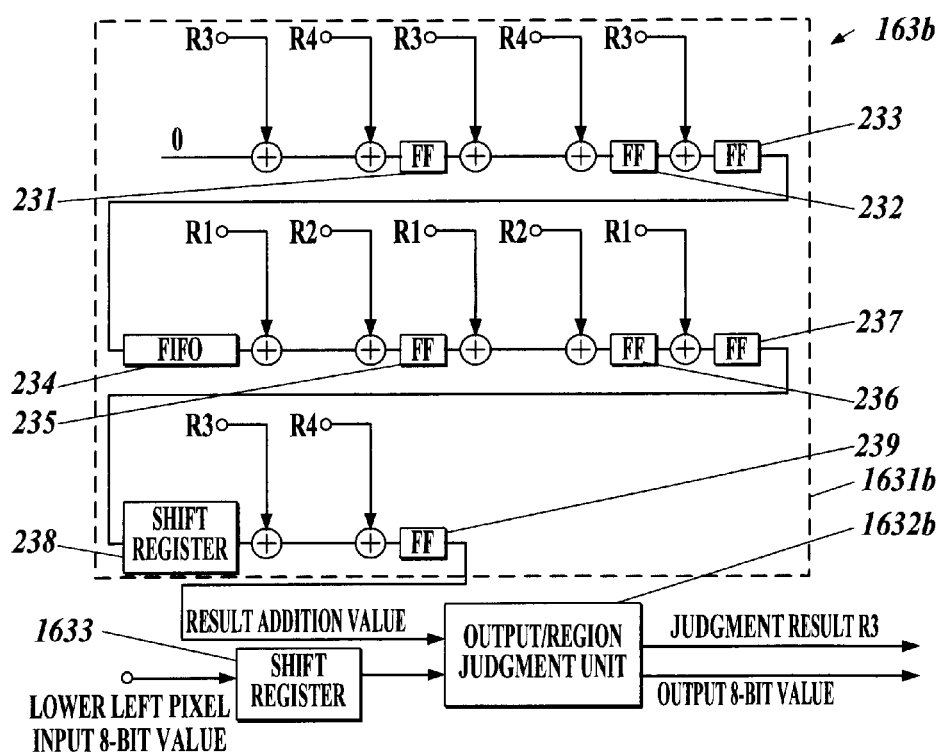
FIG. 7A illustrates the configuration of the region judgment processing unit.
Figure 7B:
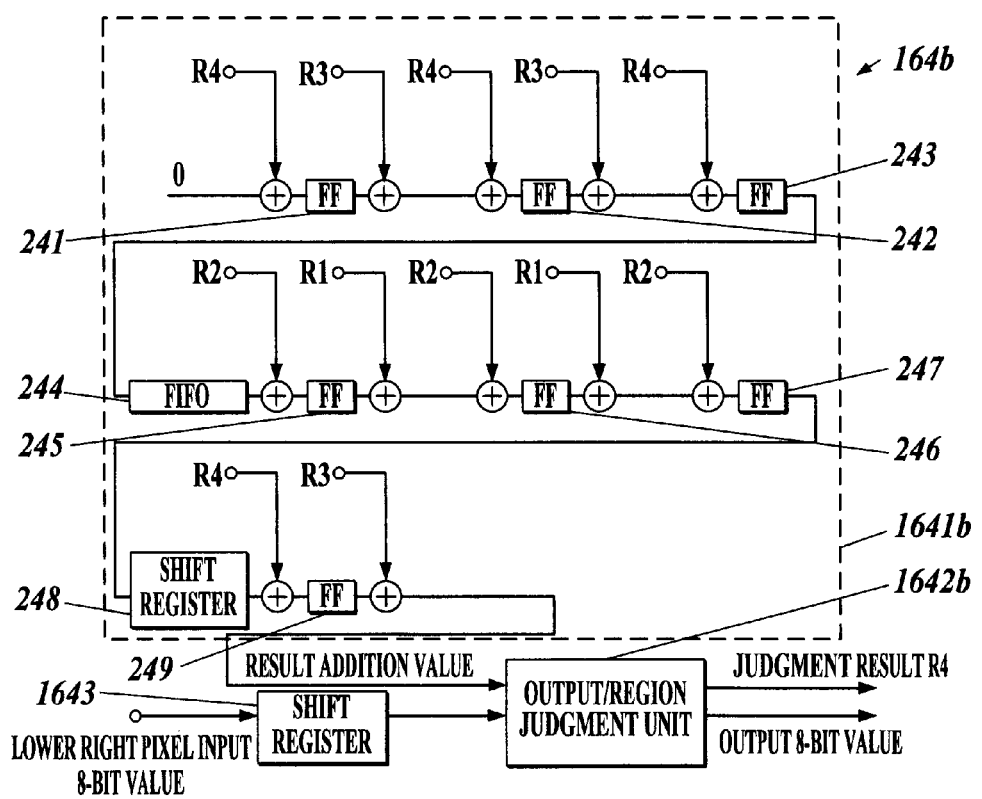
FIG. 7B illustrates the configuration of the region judgment processing unit.

FIG. 6A illustrates the calculating unit 161b that performs a processing on the 8-bit input value showing the color value of the upper left pixel in the packing. FIG. 6B illustrates the calculating unit 162b that performs a processing on the 8-bit input value showing the color value of the upper right pixel in the packing. FIG. 7A illustrates the calculating unit 163b that performs a processing on the 8-bit input value showing the color value of the lower left pixel in the packing. FIG. 7B illustrates the calculating unit 164b that performs a processing on the 8-bit input value showing the color value of the lower right pixel in the packing. The respective calculating units 161b to 164b sequentially receive the 8-bit data at every one clock cycle, thus performing processing in one step.

As shown in FIG. 6A, the calculating unit 161b includes: a judgment result addition unit 1611b; an output/region judgment unit 1612b; and the shift register 1613. Similarly, the calculating unit 162b includes: the judgment result addition unit 1621b; an output/region judgment unit 1622b; and the shift register 1623 (FIG. 6B). The calculating unit 163b includes: a judgment result addition unit 1631b; an output/region judgment unit 1632b; and the shift register 1633 (FIG. 7A). The calculating unit 164b includes: a judgment result addition unit 1641b; an output/region judgment unit 1642b; and the shift register 1643 (FIG. 7B).

The judgment result addition units 1611b, 1621b, 1631b, and 1641b have the same configuration as that of the error addition units 1611, 1621, 1631, and 1641 of the image forming apparatus 1 of the first embodiment except for that the judgment result addition units 1611b, 1621b, 1631b, and 1641b do not include twelve multipliers and no distribution coefficient is inputted to the multipliers. Thus, the same components as those as the image forming apparatus 1 of the first embodiment are denoted with the same reference numerals and will not be described further.

In the judgment result addition units 1611b, 1621b, 1631b, and 1641b, the values outputted from the output/region judgment units 1612b, 1622b, 1632b, and 1642b that show the judgment result as an index value (i.e., a value of 0 or 1) are directly inputted to adders. The result value obtained by simply adding these inputted 12 values is outputted as an intermediate value to the output/region judgment unit after M+2 steps. Specifically, the judgment result addition units 1611b, 1621b, 1631b, and 1641b of this embodiment output, to the output/region judgment unit, an integer value of 0 at the minimum and 12 at the maximum.

The output/region judgment unit 1612b judges, based on the 8-bit input value and the value outputted from the judgment result addition unit 1611b as an intermediate value, whether the pixel regarding the inputted value is a pixel within the character region or not.

When it judges that the pixel is a pixel within the character region, an index value of 1 is outputted to the judgment result addition unit 1611b.

When the 8-bit input value is not 0 or 255, the 8-bit value is corrected to whichever value closer to 0 or 255 and the corrected 8-bit value is outputted to the output control unit 17.

When it judges that the pixel is not a pixel within the character region on the other hand, an index value of 0 is outputted to the judgment result addition unit 1611b and the inputted 8-bit data is directly outputted as an output value to the output control unit 17.

The operation of the output/region judgment units 1622b, 1632b, and 1642b is the same as that of the output/region judgment unit 1612b and thus will not be described further.

The output/region judgment units 1612b, 1622b, 1632b, and 1642b judge whether the inputted pixel is a pixel within the character region or not based on whether the result addition value outputted from the judgment result addition units 1611b, 1621b, 1631b, and 1641b is 6 or more for example. Alternatively, the judgment can be done based on whether the result addition value is 4 or more and the 8-bit value of the pixel is within a predetermined range from 0 or 255 or not. In this embodiment, the judgment is performed based on the data of 12 pixels surrounding the pixel regarding the inputted value. However, the judgment can also be performed based on data of a higher number of pixels or input data regarding the pixels within the scope of a more complicated shape.

As described above, the image forming apparatus 1b of this embodiment is an image processor that performs not only the halftone processing using the error diffusion algorithm but also the region judgment processing using an intermediate value calculated and stored based on the region determination result of the surrounding pixels for example. In this region judgment processing, pixel data as a target of the image processing is subjected to an image conversion processing using an intermediate value calculated based on the pixel data at the predetermined relative positions. Thus, a plurality of pieces of pixel data can be processed in parallel without requiring a complicated processing for the input of the packing data, thus providing a stable and high-speed image conversion processing without imposing an excessive load on the region judgment processing unit 16b.

The present invention is not limited to the above embodiment and can be subjected to various changes. For example, a halftone processing and a character region judgment processing performed in the above embodiment as image conversion processing may also be performed continuously. Any processing other than the image conversion processing may also be performed based on other index values or intermediate values. For example, the present invention is not limited to the color value binarization processing but may also be used for the conversion to an image having a smaller number of tones than that of the original image. The image processor of the second embodiment outputs a binarized index value in the above embodiment. However, the image processor may output a multivalued index value for a more flexible and strict classification.

In the above embodiment, the four calculating units 161 to 164 and 161b to 164b are provided to the data packed for every 2×2 pixels to perform an image conversion processing. However, the packing configuration is not limited to this. The packing configuration may be appropriately changed within the range in which the processing can be performed in one clock cycle. For example, an image converted to have 2400 dp may be subjected to the packing of 4×4 pixels. Thus, the error diffusion processing unit 16 or the region judgment processing unit 16b can be configured by increasing or decreasing the number of the calculating units in accordance with the pixel number in the packing.

Furthermore, in the above embodiment, image data represented by CMYK colors are subjected to a conversion processing. However, the present invention can also be applied to image data represented by a gray scale or image data represented by RGB colors.

Furthermore, in the above embodiment, the pixel data delay processing is performed by a shift register and an FIFO memory. However, the delay method is not limited to this. The present invention can also be carried out by storing the delay method in a general volatile memory and calling the same based on the address.

In the above embodiment, all of the calculating, data storing, and moving processing are performed in synchronization with the same clock signal. However, another configuration may also be used where only the input timing of the upper left pixel in the packing is controlled based on a clock signal and the other processing is sequentially carried out when the input of all data is performed.

In the above embodiment, the error component values calculated in the respective clock cycles are added to the intermediate data of the respective error accumulation values and the respective error accumulation values are stored in the respective FF, FIFO, and shift registers for example. However, an opposite configuration may also be used where the values of the respective error components are stored in FF, FIFO, and shift registers for example and the error accumulation values are calculated in one step or a more limited number of steps and is transmitted to the output/error calculating unit.

The combination and arrangement of specific components shown in the embodiment can be appropriately changed within the intention of the present invention.

What is claimed is:

1. An image processor that obtains pieces of pixel data from a piece of image data divided in packing units, the packing units each being a predetermined matrix including a plurality of pixels at least in a sub scan direction, and that performs a predetermined image conversion processing using the respective pieces of pixel data and an intermediate value calculated for each piece of pixel data based on the other pieces of pixel data in the packing unit, the image processor comprising:
   a parallel processing unit that performs the image conversion processing in parallel on a piece of pixel data arranged in the sub scan direction in the packing unit, based on the obtained piece of pixel data and the intermediate value for the piece of pixel data, to calculate an output value after the piece of pixel data is converted and an index value indicating an evaluation of the output value, respectively;
   an intermediate value calculating unit that calculates, for the obtained piece of pixel data, the intermediate value based on the index value calculated by the parallel processing units for each of the pieces of pixel data within a predetermined relative position range; and
   a first retention unit that delays starting of the image conversion processing for
   one piece of pixel data by the parallel calculating unit for a delay period set to be equal to or longer than a period required from obtaining the one piece of pixel data until the intermediate value for the one pixel data is calculated by the intermediate value calculating unit;
   wherein the obtaining of the pieces of the pixel data in the packing unit, and respective operations of the first retention unit, the parallel processing unit, and the intermediate value calculating unit are performed in synchronization with one clock signal.

2. The image processor according to claim 1, wherein:
   the image conversion processing based on the one piece of pixel data obtained from the packing is set to be performed within the same cycle of the clock signal, for the pieces of pixel data positioned on the same one main scan line, and performed at a timing delayed by the first retention unit by an integral multiple of the cycle of the clock signal based on the number of lines ahead in the sub scan direction and a width of the relative position range in the main scan direction, for the pieces of pixel data positioned on different main scan lines.

3. The image processor according to claim 1, wherein:
   the first retention unit serially retains the obtained pieces of pixel data for every relative position in the packing and delays the image conversion processing by the parallel processing unit, based on a delay amount set based on the relative position.

4. The image processor according to claim 3, further comprising a second retention unit that retains the output value calculated by the parallel processing unit for a predetermined period for every relative position in the packing, wherein:

a period obtained by adding a period during which the image data is retained by the first retention unit and a period during which the output value is retained by the second retention unit for the each relative position is set to be equal regardless of the relative position.

5. The image processor according to claim 1, wherein:

the intermediate value calculating unit calculates the intermediate value for the obtained piece of pixel data by sequentially adding the index value required for calculating the intermediate value, each time the parallel processing unit calculates the index value.

6. The image processor according to claim 1, wherein:

the image conversion processing is a halftone processing to binarize a multi-bit value representing the respective pieces of pixel data, the parallel processing unit calculates a difference between the multi-bit value of the obtained piece of pixel data and the binarized output value as the index value, and the intermediate value calculating unit calculates, as the intermediate value for the piece of pixel data, an accumulation value by adding values obtained by multiplying the index value at the respective pixels included in the relative position range by a predetermined distribution coefficient based on the relative position of the obtained piece of pixel data.

7. An image processor that obtains pieces of pixel data from a piece of image data divided in packing units, the packing units each being a predetermined matrix including a plurality of pixels in a main scan direction and in a sub scan direction, and that performs a predetermined image conversion processing using the respective pieces of pixel data and an intermediate value calculated for each piece of pixel data based on the other pieces of pixel data in the packing unit, the image processor comprising:

a parallel processing unit that performs the image conversion processing in parallel on a piece of pixel data arranged in the sub scan direction in the packing unit, based on the obtained piece of pixel data and the intermediate value for the piece of pixel data, to calculate an output value after the piece of pixel data is converted and an index value indicating an evaluation of the output value, respectively;

an intermediate value calculating unit that calculates, for the obtained piece of pixel data, the intermediate value based on the index value calculated by the parallel processing units for each of the pieces of pixel data within a predetermined relative position range; and a first retention unit that delays starting of the image conversion processing for one piece of pixel data by the parallel calculating unit for a delay period set to be equal to or longer than a period required from obtaining the one piece of pixel data until the intermediate value for the one pixel data is calculated by the intermediate value calculating unit;

wherein the obtaining of the pieces of the pixel data in the packing unit, and respective operations of the first retention unit, the parallel processing unit, and the intermediate value calculating unit are performed in synchronization with one clock signal.

8. The image processor according to claim 7, wherein:

the image conversion processing based on the one piece of pixel data obtained from the packing is set to be performed within the same cycle of the clock signal, for the pieces of pixel data positioned on the same one main scan line, and performed at a timing delayed by the first retention unit by an integral multiple of the cycle of the clock signal based on the number of lines ahead in the sub scan direction and a width of the relative position range in the main scan direction, for the pieces of pixel data positioned on different main scan lines.

9. The image processor according to claim 7, wherein:

the first retention unit serially retains the obtained pieces of pixel data for every relative position in the packing and delays the image conversion processing by the parallel processing unit, based on a delay amount set based on the relative position.

10. The image processor according to claim 9, further comprising a second retention unit that retains the output value calculated by the parallel processing unit for a predetermined period for every relative position in the packing, wherein:

a period obtained by adding a period during which the image data is retained by the first retention unit and a period during which the output value is retained by the second retention unit for the each relative position is set to be equal regardless of the relative position.

11. The image processor according to claim 7, wherein:

the intermediate value calculating unit calculates the intermediate value for the obtained piece of pixel data by sequentially adding the index value required for calculating the intermediate value, each time the parallel processing unit calculates the index value.

12. The image processor according to claim 7, wherein:

the image conversion processing is a halftone processing to binarize a multi-bit value representing the respective pieces of pixel data, the parallel processing unit calculates a difference between the multi-bit value of the obtained piece of pixel data and the binarized output value as the index value, and the intermediate value calculating unit calculates, as the intermediate value for the piece of pixel data, an accumulation value by adding values obtained by multiplying the index value at the respective pixels included in the relative position range by a predetermined distribution coefficient based on the relative position of the obtained piece of pixel data.

13. An image forming apparatus, comprising:

an image processor that obtains pieces of pixel data from a piece of image data divided in packing units, the packing units each being a predetermined matrix including a plurality of pixels at least in a sub scan direction, and that performs a predetermined image conversion processing using the respective pieces of pixel data and an intermediate value calculated for each piece of pixel data based on the other pieces of pixel data in the packing unit;

an input unit that divides a piece of image data into packing units to input the divided pieces of data to the image processor;

an output control unit that controls an output timing of a value outputted from the image processor; and an image forming unit that forms an image based on the value outputted from the image processor;

wherein the image processor comprises:

a parallel processing unit that performs the image conversion processing in parallel on a piece of pixel data arranged in the sub scan direction in the packing unit, based on the obtained piece of pixel data and the intermediate value for the piece of pixel data, to calculate the output value after the piece of pixel data is converted and an index value indicating an evaluation of the output value, respectively;

an intermediate value calculating unit that calculates, for the obtained piece of pixel data, the intermediate value based on the index value calculated by the parallel processing units for each of the pieces of pixel data within a predetermined relative position range; and a first retention unit that delays starting of the image conversion processing for one piece of pixel data by the parallel calculating unit for a delay period set to be equal to or longer than a period required from obtaining the one piece of pixel data until the intermediate value for the one pixel data is calculated by the intermediate value calculating unit; and wherein the obtaining of the pieces of the pixel data in the packing unit, and respective operations of the first retention unit, the parallel processing unit, and the intermediate value calculating unit are performed in synchronization with one clock signal.

14. An image forming apparatus, comprising:

an image processor that obtains pieces of pixel data from a piece of image data divided in packing units, the packing units each being a predetermined matrix including a plurality of pixels in a main scan direction and in a sub scan direction, and that performs a predetermined image conversion processing using the respective pieces of pixel data and an intermediate value calculated for each piece of pixel data based on the other pieces of pixel data in the packing unit;

an input unit that divides a piece of image data into packing units to input the divided pieces of data to the image processor;

an output control unit that controls an output timing of a value outputted from the image processor; and an image forming unit that forms an image based on the value outputted from the image processor;

wherein the image processor comprises:

a parallel processing unit that performs the image conversion processing in parallel for the same number of pieces of pixel data as the pieces of pixel data in the packing unit, based on the obtained piece of pixel data and the intermediate value for the piece of pixel data, to calculate the output value after the piece of pixel data is converted and an index value indicating an evaluation of the output value, respectively;

an intermediate value calculating unit that calculates, for the obtained piece of pixel data, the intermediate value based on the index value calculated by the parallel processing units for each of the pieces of pixel data within a predetermined relative position range; and a first retention unit that delays starting of the image conversion processing for one piece of pixel data by the parallel calculating unit for a delay period set to be equal to or longer than a period required from obtaining the one piece of pixel data until the intermediate value for the one pixel data is calculated by the intermediate value calculating unit; and wherein the obtaining of the pieces of the pixel data in the packing unit, and respective operations of the first retention unit, the parallel processing unit, and the intermediate value calculating unit are performed in synchronization with one clock signal.

* * * * *